United States Patent [19]

Czulak et al.

[11] Patent Number: 4,476,143

[45] Date of Patent: Oct. 9, 1984

[54] METHOD FOR THE MANUFACTURE OF CHEESE WITH A SUBSTANTIALLY REDUCED FAT CONTENT

[75] Inventors: Jozef Czulak, Mount Eliza; Richard Spieler, Doncaster, both of Australia

[73] Assignee: David Lavery & Son Proprietary Limited, Melbourne, Australia

[21] Appl. No.: 456,012

[22] PCT Filed: May 5, 1982

[86] PCT No.: PCT/AU82/00067

§ 371 Date: Dec. 30, 1982

§ 102(e) Date: Dec. 30, 1982

[87] PCT Pub. No.: WO82/03971

PCT Pub. Date: Nov. 25, 1982

[30] Foreign Application Priority Data

May 12, 1981 [AU] Australia .............................. PE8824

[51] Int. Cl.³ ........................ A23C 9/12; A23C 19/00; A23L 1/10

[52] U.S. Cl. ...................................... 426/40; 426/582; 426/804

[58] Field of Search ........................ 426/34, 36, 40, 41, 426/42, 43, 582, 804

[56] References Cited

U.S. PATENT DOCUMENTS

| | | | |
|---|---|---|---|
| 2,141,698 | 12/1938 | Saunders | 426/36 |
| 3,156,568 | 11/1964 | Hargrove et al. | 426/40 |
| 3,316,098 | 4/1967 | Noznick et al. | 426/40 |
| 4,085,228 | 4/1978 | Reinbold et al. | 426/36 |

FOREIGN PATENT DOCUMENTS

| | | | |
|---|---|---|---|
| 16292 | 10/1980 | France | 426/582 |

OTHER PUBLICATIONS

Kosikowski, Cheese & Fermented Milk Foods, 1966, pp. 15 and 201–223.

*Primary Examiner*—Raymond Jones
*Assistant Examiner*—Marianne S. Minnick
*Attorney, Agent, or Firm*—Shlesinger Arkwright Garvey & Fado

[57] ABSTRACT

A method of producing a low-fat cheese product comprises the steps of inoculating milk having a fat content of between 0.3% and 1.5% with a culture of *Lactobacillus bulgaricus* and *Streptococcus thermophilus* and with a culture of *Lactobacillus casei* in addition to a normal cheese starter culture whereby the culture of *Lactobacillus bulgaricus* and *Streptococcus thermophilus* produce the required flavor and rapid fermentation of lactose and the culture of *Lactobacillus casei* assists in hydrolysis of protein. Syneresis of the curd is impeded by the addition of a monovalent cation such as sodium in the form of sodium chloride.

6 Claims, No Drawings

METHOD FOR THE MANUFACTURE OF CHEESE WITH A SUBSTANTIALLY REDUCED FAT CONTENT

FIELD OF THE INVENTION

This invention relates to the manufacture of cheese with a substantially reduced fat content.

DESCRIPTION OF THE PRIOR ART

Cheese made from milk with substantially reduced fat (skim milk cheese, low fat cheese) presents problems in manufacture in that it is difficult to ensure that sufficient moisture is retained in the substance and the flavour development in this product, largely devoid of fat, is extremely slow. Consequently, cheese made from substantially fat reduced milk tends to be hard, has little flavour, and therefore has a low consumer appeal.

In order to overcome the disadvantages of prior known processes, it is an object of the present invention to provide a method of manufacturing cheese with a substantially reduced fat content including the incorporation of higher moisture content, more pliable body and the development of more flavour.

It is known in cheese making processes that the curd or coagulum shrinks in response to heat, the level of which is termed the cooking temperature, and in response to a drop in pH. Also it is understood that Calcium ions associated with the casein act as bridges or links in the shrinking processes so that the higher the calcium content, the more severe will be the shrinkage and the more extensive will be the expulsion of moisture from the coagulum.

Normally, cheese is made with lactic bacteria which ferment lactose to lactic acid. There are among the lactic bacteria some species which, besides producing lactic acid, can also be develop other flavour compounds. Such cultures are for instance used in Yogurt manufacture. They consist of strains of Lactobacillus bulgaricus and Streptococcus thermophilus. U.K. Pat. No. 1464617 (Leprino) describes a process of making a pasta filata cheese, comprising the steps of:

- (a) inoculating a batch of pasteurized cow's milk with a pasta filata starter culture providing an effective amount of Streptococcus thermophilus and at least one Lactobacillus capable of growing at a temperature in the range of from 110° to 120° F.;
- (b) converting the milk batch to a mixture of curd and whey;
- (c) cooking the curd-whey mixture at a temperature favoring the growth of said Streptococcus thermophilus and Lactobacillus;
- (d) separating the resulting warm granular curd from the whey, the curd having an internal pH in the range of from 5.6 to 6.2;
- (e) washing and cooling the separated granular curd by contacting it with water having a lower temperature than the curd; and
- (f) holding the washed and cooled granular curd at a temperature in the range of from 33° to 65° F. until the internal pH of the curd has decreased to a pH below 5.5 suitable for mixing and stretching the curd to obtain pasta filata stringiness.

U.S. Pat. No. 4,085,228 (assigned to Leprino) describes manufacturing of low-moisture Mozzarella cheese including the steps of inoculating a batch of pasteurized cow's milk with a starter culture comprising from 1 to 3% based on the weight of the milk batch of *Streptococcus thermophilus* together with Lactobacillus selected from *Lactobacillus bulgaricus, Lactobacillus helveticus,* or both *Lactobacillus bulgaricus* and *Lactobacillus helveticus,* making cheese curd from the thus-inoculated milk including cooking the curd at 100° to 125° F., mixing and stretching the curd in water at a temperature above 130° F. to impart a stringy texture to the cheese, molding the mixed curd into bodies, and salting the molded bodies, wherein the improvement comprises: inoculating said milk batch before before making the cheese curd with from 0.5 to 3.0% based on the weight of the milk batch of an additional viable culture selected from cultures of *Pediococcus cerevisiae, Lactobacillus plantarum, Streptococcus faecalis, Streptococcus durans* and *Lactobacillus casei,* and at the conclusion of said proces holding the salted cheese bodies at a non-freezing temperature below 55° F. for 5 to 30 days while reducing the residual lactose sugar content of the cheese, said holding being continued until said cheese bodies have an average lactose sugar content below 0.3%. The same disclosure is made in French publication No. 2 361 822.

French specification No. 2161766 (Marchand) describes a manufacturing process generally the same as that for ordinary yoghurt and cheese.

German specification No. 26 57418 describes a mnaufacturing method using prolonged incubation and as cultures Lactobacillus casei together with ordinary cultures.

SUMMARY OF THE INVENTION

It is an object of the present invention to provide a manufacturing process for a natural cheese which is of substantially reduced fat contant.

A further object is to develop a natural cheese of substantially reduced kilojoule value. Yet another object is to provide a cheese of texture and flavour such that it is suitable for direct consumption by consumers as a "table" cheese (rather than cheese for manufacturing purposes) as a substitute for hard and semi-hard varieties such as Cheddar, Edam, Gouda, Colby, Cheedam, Cheshire, Monterey, Port de Salut, and others.

Thus broadly this invention provides a method of manufacturing cheese with a substantially reduced fat content including the steps of inoculating a batch of milk of a fat content of 0.3 to 1.5% with a normal cheese starter culture together with a culture of *Lactobacillus bulgaricus* and Streptococcus thermophilus to produce the required flavour and to obtain rapid fermentation of lactose and a culture of *Lactobacillus casei* to assist in hydrolysis of protein.

In the method of manufacture of the present invention we use in addition to the normal cheese starters, amounts of *Lactobacillus bulgaricus* and *Streptococcus thermophilus* selected for their specific flavour producing spectra (properties). In addition, in the present invention, an inoculum is added of *Lactobacillus casei.*

Also a monovalent cation such as Sodium is added to the curd/whey mixture to impede syneresis of the curd.

DETAILED DESCRIPTION

According to one embodiment of this invention, the following method of manufacture is provided:

Milk is standardised to a low fat content in the range of 0.3 to 1.5%, preferably 0.4 to 0.5%, depending on the desired fat content of the cheese. The milk is then pasteurised at temperatures in the range of about 72° C. to 80° C. maintained for 12 to 20 seconds. The milk is then cooled down to a temperature of about 29° C. to 32° C. and the following bacteriological cultures are then added to the milk in specified amounts and stirred in:

0.5% to 3.0% normal cheese starter culture 0.1% to 1.0% selected strains of *Lactobacillus bulgaricus*

0.1% to 1.0% selected strains of *Streptococcus thermophilus*

0.05% to 0.3% of selected strains of *Lactobacillus casei.*

Next, about 19 grams of 31 grams of liquid rennet per 100 liters of milk, or other coagulating enzymes are added and stirred in. The purpose of this step is to coagulate the milk within less than one hour.

The temperature of the milk is maintained at approximately the same level (29° C. to 32° C.) and the milk is allowed to coagulate. The coagulating process takes between 30 and 45 minutes. When the milk is firmly coagulated, the curd is cut by mechanical means into cubes not exceeding 1.2 cm in either direction. When free whey appears, a sample is taken for acid determination. Usually at this stage, the acidity in terms of lactic acid is within the limits of 0.10% to 0.12%. This is accepted as a starting guideline for determination of acid development.

The curd and whey are now subjected to agitation to aid moisture expulsion, and when the curd is sufficiently firm as judged by visual or other sensory tests such as squeezing in hand, the agitation is stopped and an amount of whey is drained off and replaced with hot water, its quantity and temperature depending on the desirable ultimate acidity and degree of shrinkage or syneresis of the curd required. This in turn determines the ultimate moisture content and mineral and acid equilibria in the finished cheese. For instance, it may be necessary to add water at up to about 54° C. temperature to raise the curd/whey mixture to about 35° C. At the same time between 0.3% to 1.5% of salt (NaCl) by weight of the initial milk quantity is added, either directly to the curd and whey or dissolved in hot water. This step retards further shrinkage of the curd. Because of the addition of water the lactic acid already produced is diluted and so is the lactose content. Acid development is therefore reduced and the ultimate pH level of the cheese is thus controlled, so that it does not fall below the value of 5.1. The ultimate pH of the cheese refers to its value three weeks after manufacture. This is an important factor in our method. If the pH at three weeks is less than 5.1, the product has a tough body, a tendency to have a paler/bleached appearance and an undesirable sour taste. Our method of manufacture here differs from other methods of manufacture of cheeses mainly because the additional fat in other cheeses has the tendency to buffer the adverse effects mentioned above. For our low fat cheese, we effect tighter control of the relevant variables than for most other cheeses varieties. The maximum pH which is acceptable for our product (at three weeks after manufacture) is 5.5. Typically, we have 5.3 to 5.4. By way of comparison, the minimum/maximum pH figures acceptable for cheddar cheese are 4.9 and 5.5 with a typical of 5.2 or 5.3.

It is probably worth explaining that when the curd is initially in the whey, there is a development of acid. When the whey is drained off and water added instead, there is a dilution of this acidity but acid development continues so that, once again, acidity begins to rise. As soon as the curd has reached the desired temperature, say, within 30 minutes from the addition of the hot water, all the free liquid (whey/water mixture) is drained off. At this stage it is essential that the acidity of the whey/water mixture does not exceed significantly the acidity of the whey immediately after cutting. Otherwise the cheese may become too acid. From then onwards the separated curd is fused, subdivided, and either dry salted, hooped and pressed or hooped, pressed and salted by immersion in brine.

The finished cheese can be either waxed or packed in plastic film and then stored until it reaches the desired maturity.

A typical manufacturing schedule is as follows:

9000 liters skim milk containing 0.5% fat is inoculated with 109 liters Normal Starter: 1.21%

23 liters selected strains of *Streptococcus thermophilus:* 0.25%

23 liters selected strains of *Lactobacillus bulgaricus:* 0.25%

9 liters *Lactobacillus casei:* 0.1%

Add 114 grams colour (Anattao) in 10 parts water

Set Vat with 2 Kilograms Rennett

Allow to coagulate in 35 to 50 minutes

Cut curd gently

Let stand for 5 minutes

Slowly stir for about 10 minutes

Stop stirring and allow curd to settle

Pump half whey off

Add 45 kg salt

Stir for 10 minutes

Add water at 37° C.—bring level to 10,000 liters

Stir for about 10 minutes

Pump out and drain free whey from curd

Cheddar for 20 minutes

Mill and Salt

It is reiterated that an essential feature of this invention is the use of a culture of Lactobacillus casei, which, because of its ability to break the casein micelle down into its components, alters the consistency (body) of the cheese from rubbery hard to pliable soft.

It may be desirable in the case of some consumers to provide cheese with a stronger flavour of the type encountered in Parmesan or Romano cheese varieties. To meet such a demand a lipolytic activity in the cheese can be ensured by the addition of about 1.5 grams to 6 grams of a lipase enzyme preparation obtained from lamb or kid salivary glands per 100 liters of milk. Enzyme preparations of this kind are already used in cheese manufacture.

An embodiment of the invntion described above applies to cheese varieties of the cheddar type. In the case of other varieties such as Gouda, Edam, Port du Salut and Bel Paese, instead of separating the curd from the whey/water mixture, the curd is compressed under this whey/water mixture into a solid mass. The consolidaated fused curd mass is then cut into portions suitable for moulding, pressing, and then salting in brine as individual cheeses.

In the case of other varieties for example, Tilsit, the curd is separated from the whey/water mixture and is thereafter treated as appropriate for such variety.

In the method of manufacture of the present invention we allow for very little acid development to take place. We also treat the curd at relatively low temperatures (not exceeding 38° C.) and we replace some calcium ions by monovalent ions (e.g. sodium) which, being monovalent chemically, have no bridging (shrinking) properties of the curd.

In the process of manufacturing cheese, it is normal to add salt (NaCl) for purposes of flavour. There are several techniques for adding salt including brine salting, dry salting, etc. However, it is important to note that in our manufacturing method, the reason for adding salt to the curd in the whey is not for purposes of flavour but to obtain the required ion exchange. The purpose of this ion exchange is to disrupt bridges between casein micelles, thereby limiting the contraction of the casein network and, thus, the contraction of the curd.

It should be noted that it is not necessary to add salt in the form of NaCl. Indeed, it is possible at this stage to add any monovalent ion (obviously it must be a permissible food additive) which will displace the divalent calcium cation associated with the casein of the milk.

We prefer to use NaCl because:

It is a monovalent ion.

It is a permitted food additive.

It is readily available.

It is inexpensive.

It has some affect in reducing the amount of salt which is required to be added later for flavour purposes.

We claim:

1. The method of manufacturing a reduced fat content cheese from a pasteurized starter batch of milk innoculated with a starter culture and having a standardized fat content of about 0.3% to about 1.5%, comprising the steps of:

(a) adding to said starter batch an amount of about 0.1% to about 1.0% of a *Lactobacillus bulgaricus* culture, an amount of about 0.1% to about 1.0% of a *Streptococcus thermophillus* culture and an amount of about 0.05% to about 0.3% of a *Lactobacillus casei* culture;

(b) adding an amount of a coagulating enzyme to said batch, said amount sufficient to cause coagulation upon heating;

(c) maintaining said batch at a temperature of about 29° C. to about 45° C. for a time sufficient to permit coagulation of said batch into curd and whey;

(d) cutting said curd;

(e) agitating said curd and whey and thereby expelling moisture from said curd;

(f) removing a substantial portion of said whey;

(g) adding a pre-determined amount of heated water to said curd and whey for controlling the pH of said whey;

(h) adding sufficient sodium chloride to said curd and whey to conrol shrinkage of said curd;

(i) agitating said curd and whey;

(j) draining off free liquid consisting essentially of water and whey and thereby providing conditioned curd; and, (k) forming said conditioned curd into cheese having a pH of about 5.1 to about 5.5.

2. The method as defined in claim 1, wherein:

(a) substantially one-half of said whey is removed.

3. The method a defined in claim 1, wherein:

(a) said water is heated to at least 37° C.

4. The method as defined in claim 1, wherein:

(a) said coagulating enzyme is rennet.

5. The method as defined in claim 1, wherein:

(a) 0.25% of said *Streptococcus thermophillus* culture is added;

(b) 0.25% of said *Lactobacillus bulgaricus* culture is added; and, (c) 0.1% of said *Lactobacillus casei* culture is added.

6. The method as defined in claim 1, wherein:

(a) said coagulating enzyme is added in an amount sufficient to cause coagulation in about 30 to about 45 minutes.

* * * * *